United States Patent
Schmitt et al.

(10) Patent No.: US 11,945,353 B2
(45) Date of Patent: Apr. 2, 2024

(54) HOLDER FOR MOUNTING A HEADREST

(71) Applicants: Sebastian Schmitt, Nuremberg (DE); Stefan Bergler, Neumarkt (DE)

(72) Inventors: Sebastian Schmitt, Nuremberg (DE); Stefan Bergler, Neumarkt (DE)

(73) Assignee: GRAMMER AG, Ursensollen (DE)

( * ) Notice: Subject to any disclaimer, the term of this patent is extended or adjusted under 35 U.S.C. 154(b) by 107 days.

(21) Appl. No.: 17/862,918

(22) Filed: Jul. 12, 2022

(65) Prior Publication Data

US 2023/0104605 A1    Apr. 6, 2023

(30) Foreign Application Priority Data

Jul. 28, 2021  (DE) .......................... 102021119621.3

(51) Int. Cl.
| | |
|---|---|
| *B60N 2/897* | (2018.01) |
| *B60N 2/809* | (2018.01) |
| *B60N 2/882* | (2018.01) |
| *B60N 2/80* | (2018.01) |
| *B60N 2/812* | (2018.01) |

(52) U.S. Cl.
CPC ............ *B60N 2/897* (2018.02); *B60N 2/809* (2018.02); *B60N 2/882* (2018.02); *B60N 2/812* (2018.02); *B60N 2002/899* (2018.02); *B60N 2205/20* (2013.01)

(58) Field of Classification Search
None
See application file for complete search history.

(56) References Cited

U.S. PATENT DOCUMENTS

| | | | |
|---|---|---|---|
| 6,802,565 B2 | 10/2004 | Isaacson | |
| 2006/0087167 A1* | 4/2006 | Kraft | B60N 2/821 |
| | | | 297/410 |
| 2010/0194167 A1* | 8/2010 | Gans | B60N 2/818 |
| | | | 297/410 |
| 2023/0035161 A1* | 2/2023 | Schmitt | B60N 2/818 |

FOREIGN PATENT DOCUMENTS

| | | |
|---|---|---|
| DE | 69928345 U | 4/2000 |
| DE | 102017004485 B | 6/2018 |

* cited by examiner

*Primary Examiner* — David E Allred
(74) *Attorney, Agent, or Firm* — Andrew Wilford

(57) ABSTRACT

There is shown and described, inter alia, a holder for supporting a headrest, which holder can be fixed in a retaining structure of a vehicle by insertion in a first mounting direction, wherein the holder is formed with a guide passage for receiving a retaining rod of the headrest, and wherein the holder has fixing means for fixing to a retaining structure of the vehicle.

The particular feature consists in that the fixing means have at least one deflection device, having at least one movable element that is supported on the holder so as to be movable from a first position in which the movable element is in the movement path of the retaining rod inserted into the guide passage, and a second position in which the movable element is outside the movement path, wherein the element has a region that is suitable for cooperating with an abutment surface of the retaining structure, in moving between the first position and the second position, such that the retaining element is loaded in a mounting direction relative to the retaining structure.

14 Claims, 5 Drawing Sheets

Fig. 3
Fig. 4
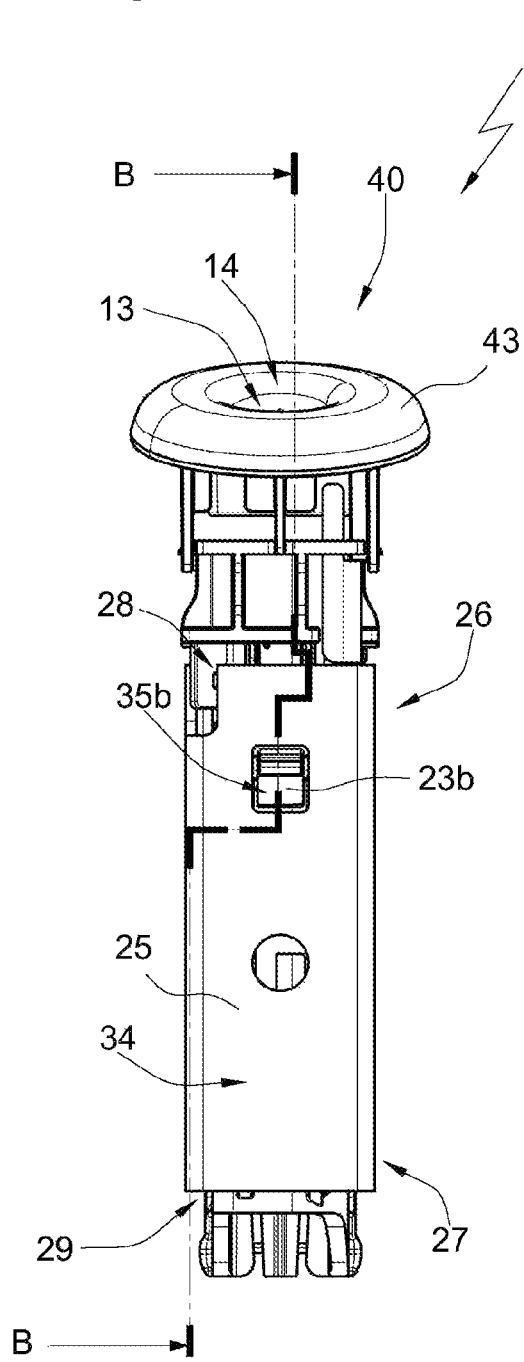
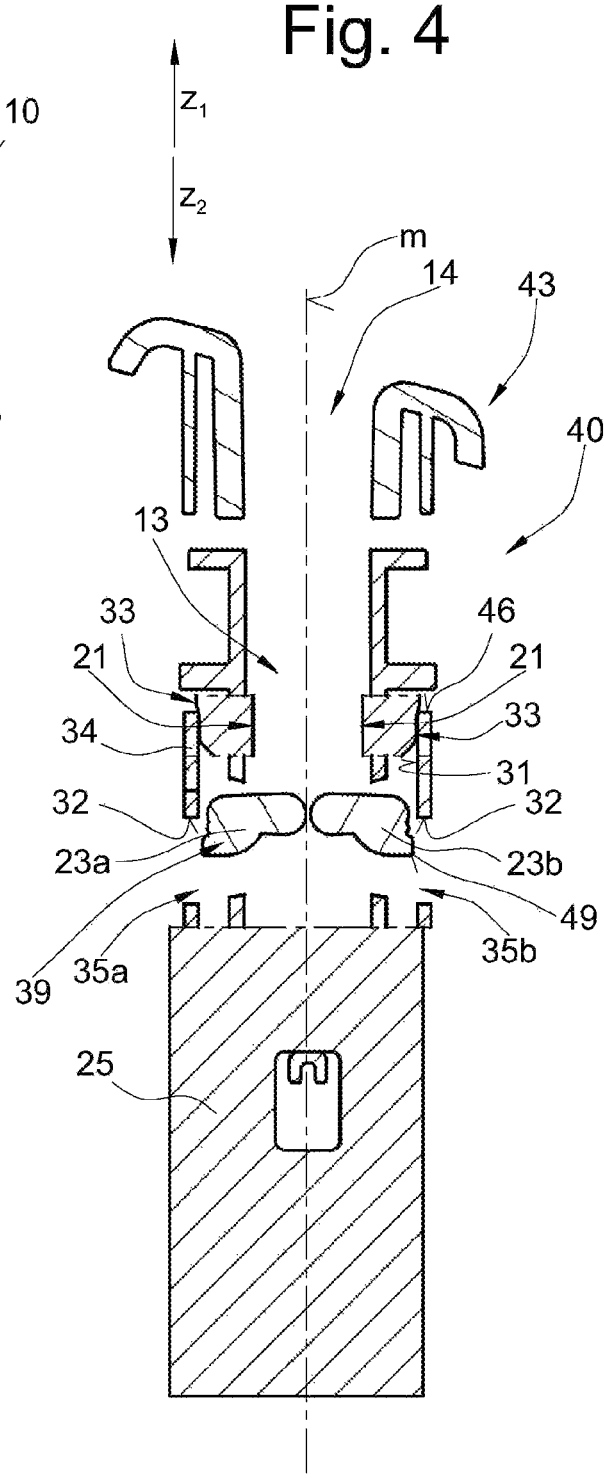

Fig. 5
Fig. 6
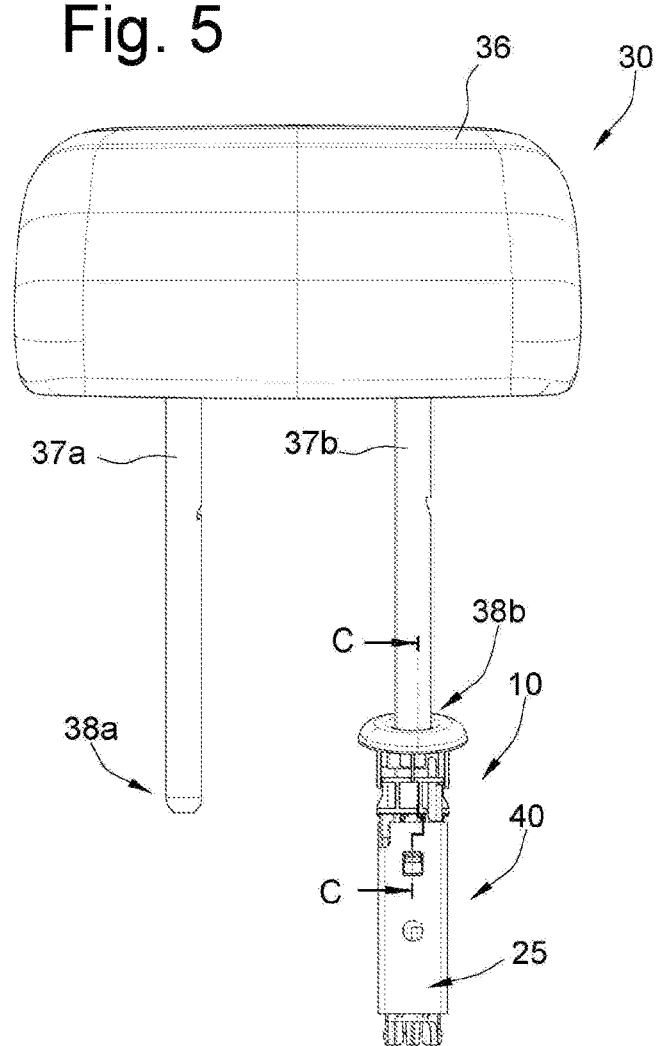
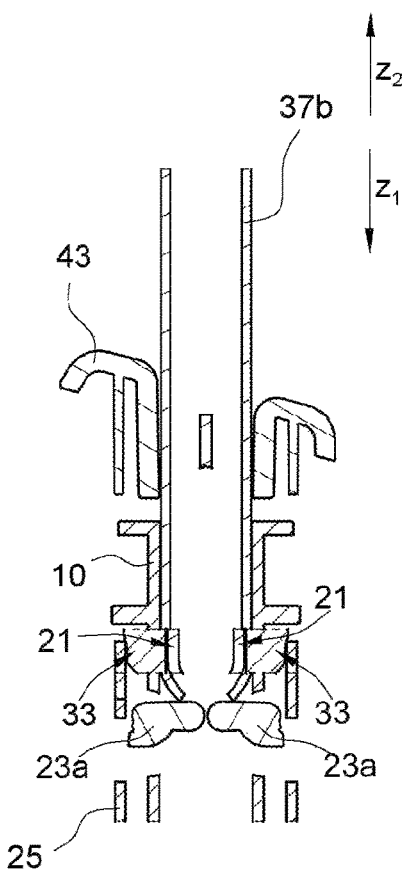

Fig. 9
Fig. 10
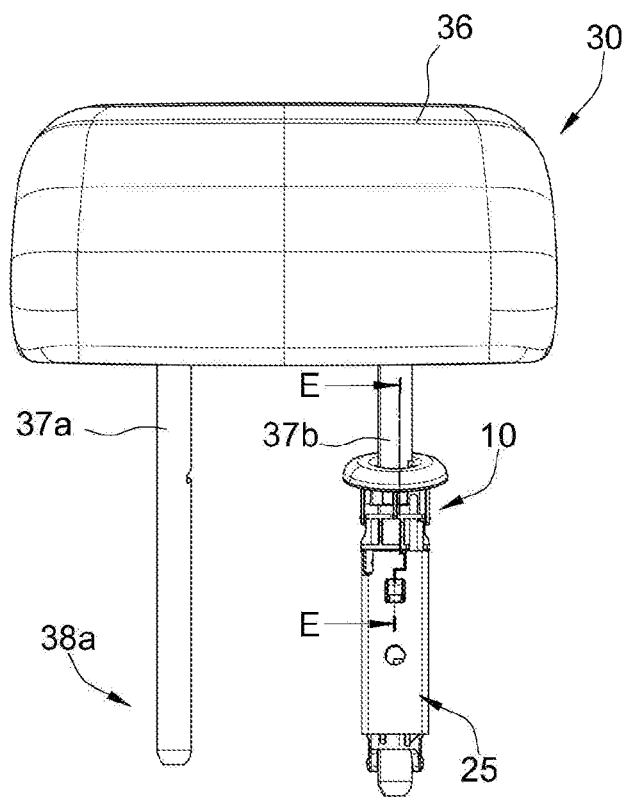
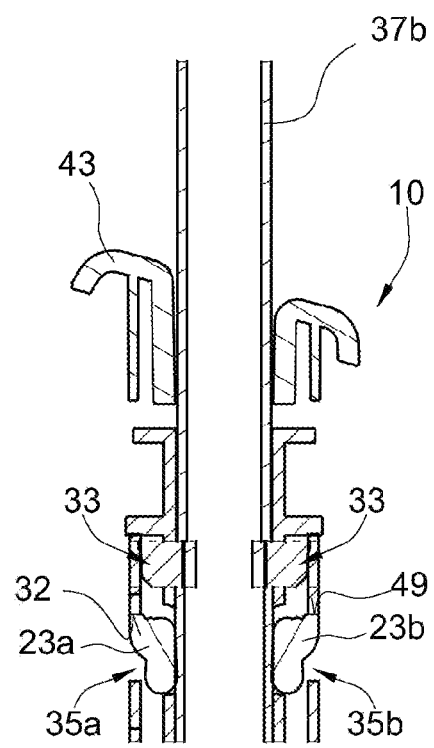

HOLDER FOR MOUNTING A HEADREST

FIELD OF THE INVENTION

The invention relates supported to a holder for supporting a headrest of a vehicle seat. Within the meaning of the invention, a vehicle can be a land vehicle, an aircraft or a watercraft.

BACKGROUND OF THE INVENTION

Such a holder is known from DE 10 2017 004 485 B3. The disclosure relates to a headrest having a bearing sleeve in which a support rod of the headrest is supported. In order to fasten the bearing sleeve to a structure of the vehicle seat, the bearing sleeve has a latch element. The latch element is movable between a latching position in which it projects beyond an outer surface of the bearing sleeve and a mounting position in which it projects beyond an outer surface to a lesser extent than in the latching position.

OBJECT OF THE INVENTION

The object of the invention was to provide a holder that can be mounted in a simple manner on a retaining structure of the vehicle. In addition, it was an object of the invention to provide on the retaining element means that ensure that the holder, after mounting, is supported within the retaining structure of the vehicle without play.

The object has been achieved by a holder having holder for supporting a headrest and that can be fixed to a retaining structure of a vehicle by insertion in a first mounting direction and where the holder is formed with a guide passage for receiving a retaining rod of the headrest and has fixing means for fixing to the retaining structure.

The holder serves for mounting of a headrest of a vehicle seat. The holder can be fixed in a retaining structure of a vehicle and can be mounted in the retaining structure by insertion in a first mounting direction. Within the meaning of the invention, a retaining structure can be a structure that is fixed directly or indirectly to the vehicle frame, in particular a structure that is fixed to the backrest of a vehicle seat. The retaining structure is configured such that the holder can be fixed in a seat of the retaining structure. The retaining structure is in the form of a sleeve, for example. It can be fixed to a seat-back structure of a vehicle seat, for example. Fixing takes place, for example, by welding, screwing or other fixing methods.

The holder is formed with a guide passage for receiving a retaining rod of the headrest. The retaining rod is guided in the holder such that it is movable in a first mounting direction for mounting and in a second, opposite direction for dismounting. The guide part has slide structures for this purpose.

For fixing to a retaining structure of the vehicle, the holder has fixing means.

According to the invention, the retaining device has a deflection device comprising at least one movable element. The movable element is supported on the holder so as to be movable from a first position in which the movable element is in the movement path of the retaining rod inserted into the guide passage, into a second position in which the movable element is outside the movement path. In other words, on insertion of the retaining rod into the guide passage, the retaining rod automatically contacts the movable element and, as the retaining rod moves further relative to the holder in the insertion direction, moves the movable element into the second position.

A force applied by the support rod to the movable element moves the element into the second position in which it is no longer arranged in the movement path. The retaining rod can thus be moved further into the holder in the mounting direction.

The movable element comprises a support region that is suitable for cooperating with an abutment surface of the retaining structure, in moving between the first position and the second position, such that the retaining element is loaded in a mounting direction relative to the retaining structure.

The feature combination according to the invention offers the possibility of moving the holder into a pre-mounting position on the retaining structure and then, by a movement of the retaining rods in the guide passage in the mounting direction, of moving the holder relative to the retaining structure into an end position. In this manner, mounting of the holder on the retaining structure is possible in a very simple manner.

The movable element is configured such that it is movable from the first position into the second position as a result of a force applied by the retaining rods. It comprises a contact region that is arranged such that it is movable by the retaining rod, wherein the movable element moves. The contact region is, for example, configured such that a movement deflection takes place, so that the force applied by the retaining rod in the mounting direction is deflected into a different direction. The contact region comprises, for example, a surface that is inclined relative to the mounting direction of the retaining rod and that, when a force is exerted thereon, causes a movement in a translatory manner of the movable element. Alternatively, the contact region comprises, for example, a surface on a lever arm of a pivotable lever. When a force is exerted on that surface, rotation of the lever, for example, is caused.

The movable element has latching structures, for example that are suitable for latching the holder on the retaining structure in the second position at least relative to a dismounting direction. The latching structures can be, for example, the same region of the movable element that cooperates with the abutment surface of the retaining structure. In this manner, additional locking elements can be avoided. In this case, the movement of additional locking elements between a latching position and a release position is also not necessary.

The movable element is configured, for example, such that in the second position a return movement of the movable element from the second position into the first position is prevented when the retaining rod is located in the guide passage. A surface of the movable element contacts the retaining rod, for example, and prevents the movable element from moving out of the second position, that is to say back in the direction of the first position.

At least one compensation structure is provided on the holder, which compensation structure is configured such that an oversize is formed relative to surfaces of the mounting seat of the retaining structure. When the holder is located in the mounting seat of the retaining structure, the oversize structure prevents play between the holder and the retaining structure. When the holder is moved into the mounting seat, parts of the oversize structure are sheared off, plastically deformed or elastically deformed, for example, such that they abut surfaces of the mounting seat without play when the holder is in the mounting seat.

The compensation structure can have a first outer surface and a second outer surface relative to a center axis of the holder, which outer surfaces are at different distances from the center axis. A first outer surface is, for example, at a first distance that is such that the surface abuts a mating surface of the retaining structure with a clearance fit or a slight interference fit. A second outer surface is, for example, at a second distance that is such that the surface abuts a mating surface of the retaining structure with a pronounced interference fit. In a pre-mounting position of the holder relative to the retaining structure, the first outer surface, for example, is in contact with a mating surface of the retaining structure. In the end position, the second outer surface is in contact with the mating surface.

The holder can have one or more movable elements. Two, three or four movable elements, for example, can be supported on the holder.

The movable element is supported on the holder so as to be movable in a translatory manner or pivotable, for example. If the movable element is pivotably supported on the holder, the pivot center point, for example, is in the region of a wall of the holder. At least one arm of the movable element can then be pivotable between different positions and form contact surfaces for contacting the retaining rod or an abutment surface.

For example, the movable element is in the form of a lever. The movable element is in the form of a two-armed lever, for example. A first lever arm of the two-armed lever cooperates, for example, with the retaining rod and a second lever arm cooperates with the retaining structure. The contact region and a support region of the movable element can then form free end regions, wherein the contact region cooperates with the retaining rod and the support region cooperates with an abutment surface of the retaining structure. By means of these features, a deflection that deflects the force applied by the retaining rod to the movable element such that the holder is moved into the mounting seat of the retaining structure can take place in a simple manner.

The holder has at least one cut-out in a wall, through which cut-out the movable element can pass. In the first position, the movable element is arranged, for example, such that it does not project from the opening or projects with only a short length. In this manner, the movable element does not interfere with mounting in the retaining structure. In the second position, the movable element projects, for example, from the opening with a longer length compared to the first position. The movable element is then able to be in contact with the abutment surface of the retaining structure.

The holder comprises, for example, first locking means of a fixing device, which first locking means, in order to lock the retaining rod in at least one position relative to the holder, can be brought into engagement with second locking means of the retaining rod. In other words, the retaining device has locking means for permitting a vertical adjustment of the retaining rod relative to the holder and for locking the retaining rod in at least two different relative positions.

For example, the holder is in the form of a sleeve. This means that a guide passage is formed that is enclosed by a wall substantially over the entire circumference of the passage. Within the meaning of the invention, "substantially over the entire circumference" means that the sleeve can have radial openings. In addition, the sleeve has at at least one end region an insertion opening for insertion of the retaining rod. In particular, openings are formed at both end regions.

According to a second aspect, the invention relates to a headrest assembly.

Such a headrest assembly is known from DE 10 2017 004 485 B3. Reference is made to the above comments relating to that document.

The object of the invention was to provide a headrest assembly that permits simple mounting of the holder on the retaining structure. It was a further object of the invention to provide a headrest assembly that allows the holder to be supported on the retaining structure without play.

The object has been achieved by a headrest assembly having a headrest with a head part (36) that can be supported, by means of at least one retaining rod in a holder and the holder can be supported on a retaining structure of the vehicle.

The headrest assembly comprises a head part having at least one retaining rod, wherein the retaining rod can be supported in a holder. If there are two retaining rods or two end regions of a hoop-shaped retaining rod, each retaining rod or each end region can be supported in a separate holder. The holder can be supported in a retaining structure of the vehicle.

The holder is configured in accordance with the first aspect of the invention, wherein at least one of the particular embodiments of the dependent claims can be implemented. The movable element of the holder is configured such that, as a result of the movement of the at least one movable element from a first position into a second position, a support region of the movable element is movable into contact with an abutment surface of the retaining structure and in this manner the holder can be loaded into the mounting seat.

The abutment surface is formed, for example, by the intrados of a cut-out in the retaining structure. The abutment surface thus does not take up any additional space and is simple to produce.

Alternatively, the abutment surface can be any surface that is suitable for forming an abutment for a force directed in the mounting direction.

According to a third aspect, the invention relates to a method of mounting a holder on a retaining structure of a vehicle.

Such a method is known from DE 10 2017 004 485 B3. With respect to the disclosure, reference is made to the first aspect of the invention.

The object of the invention was to provide a method of mounting a holder in a retaining structure that can be carried out in a simple manner. In addition, the object of the invention was to provide a method that allows the holder to be supported in the retaining structure without play.

The object has been achieved by a method in which the retaining rod is first mounted in the guide passage and then the assembly consisting of the headrest with the retaining rod and the holder is in the retaining structure in a pre-mounting position.

The holder is in a pre-mounting position relative to a retaining structure of the vehicle. If the retaining structure is formed by a sleeve, the holder is inserted into the sleeve until it is in a pre-mounting position.

The retaining rod is then moved relative to the holder in the guide passage at least over a specific length in the mounting direction, wherein at least one movable element of the holder moves from a first position into a second position. As the movable element moves from the first position into the second position, it moves into contact with the abutment surface of the retaining structure and is supported thereon such that the force exerted by the retaining rods on the movable element loads the holder in a mounting direction, for example moves it from the pre-mounting position into an end position in which the holder is in a mounting seat of the retaining structure.

According to a variant, before the holder is in the pre-mounting position, it can be mounted on the retaining rod of the headrest by insertion of the retaining rod into a guide passage of the holder, and then the assembly consisting of the headrest with the retaining rod and the holder is mounted on the retaining structure.

According to a further variant, the separate holder is first mounted on the retaining structure in the pre-mounting position and then the retaining rod is inserted into the guide passage of the holder.

An exemplary embodiment of the invention is described by way of example in the following description of the figures, also with reference to the diagrammatic drawings. In the drawings, for the sake of clarity—also where different exemplary embodiments are concerned—identical or comparable parts or elements or regions are designated with identical reference numerals, in some cases with the addition of lowercase letters.

Features, in particular the features relating to the holder that are described, shown or disclosed only in relation to one exemplary embodiment can also be provided within the scope of the invention in any other exemplary embodiment of the invention. Such modified exemplary embodiments—even if they are not shown in the drawings—are included in the invention.

All the disclosed features are essential to the invention on their own. The content of the disclosure of DE 10 2017 004 485 B3 and the described devices of the prior art—in particular in relation to the holder and the retaining structure—are thus hereby also incorporated in their entirety in the disclosure of the application, also for the purpose of incorporating individual or multiple features of the subject-matter disclosed therein in one claim or in multiple claims of the present application. Such modified exemplary embodiments—even if they are not shown in the drawings—are also included in the invention.

BRIEF DESCRIPTION OF THE DRAWING

In the figures:

FIG. 3 is a side view of the holder, wherein the holder is mounted in a retaining structure of the vehicle, FIG. 4 is a sectional view according to section line B-B in FIG. 3, FIG. 5 is a front view of a headrest assembly, wherein the holder is in a seat of a retaining structure and wherein the holder is in a pre-mounting position, FIG. 6 is a sectional view according to section line C-C in FIG. 5, FIG. 9 is a front view of the headrest assembly based on FIG. 7, wherein the holder is in the end position, and FIG. 10 is a sectional view according to section line E-E in FIG. 9.

SPECIFIC DESCRIPTION OF THE INVENTION

Figure 1:
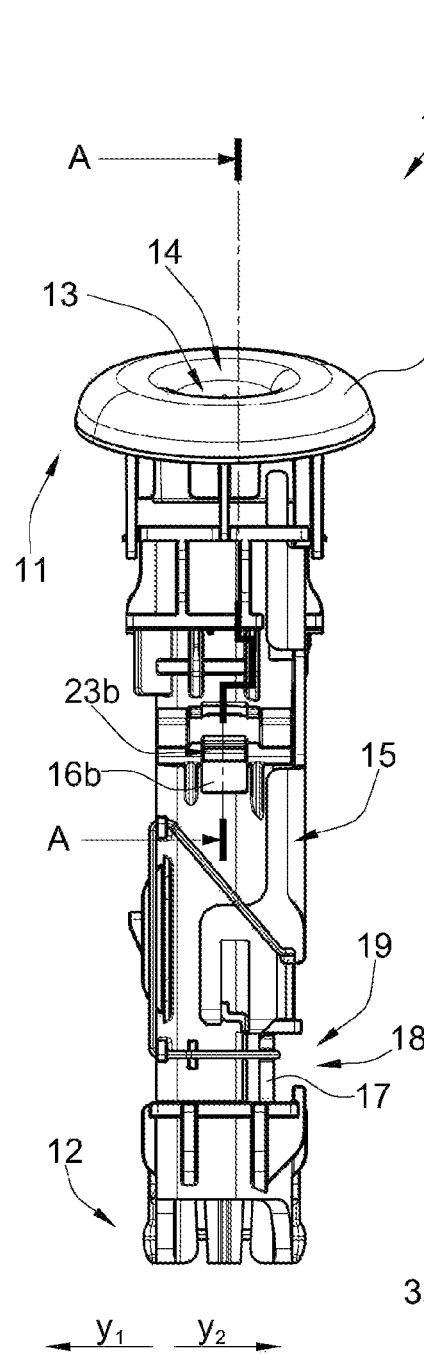
FIG. 1 is a side view of the holder.

According to FIG. 1, the holder 10 comprises an upper end region 11 and a lower end region 12. The holder 10 forms a guide passage 13 that is accessible via an opening 14. A wall 15, forming the guide passage 13, of the holder 10 has cut-outs 16a and 16b, of which only the cut-out 16b is visible in FIG. 1. As will be explained further below, the cut-outs 16a and 16b are provided for locking the holder 10 to a retaining structure (likewise not shown in FIG. 1).

Via the opening 14, a retaining rod (not shown in FIG. 1) of a headrest can be arranged in the guide passage 13. Adjacent to the opening 14 is an upholstery cover 43 that is in the form of a radially extending annular web.

A bolt 17 that is movable through a cut-out 18 between a first position and a second position, is part of a locking device 19 for locking the retaining rod of the headrest relative to the holder 10.

Figure 2A:
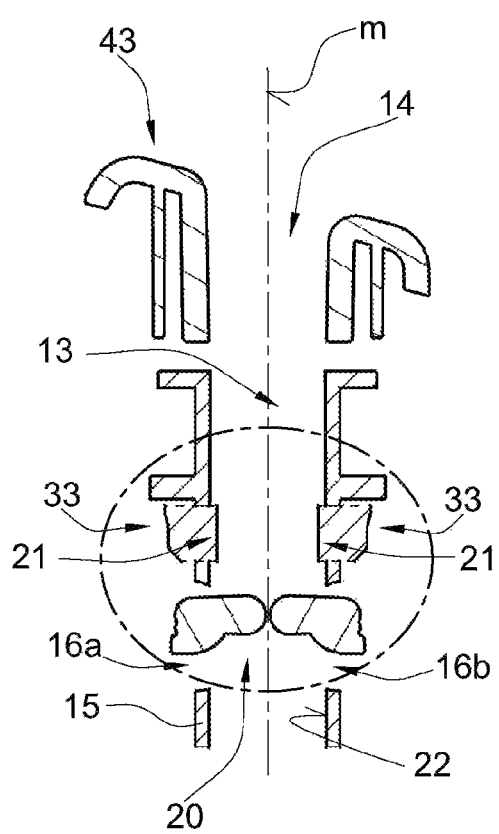
FIGS. 2A and 2B are sectional views according to section line A-A in FIG. 1.
Figure 2B:
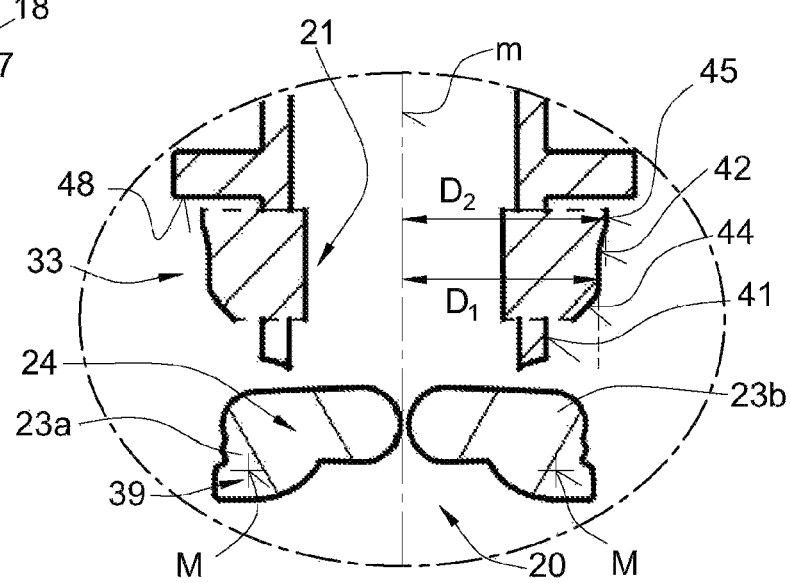
Figure 7:
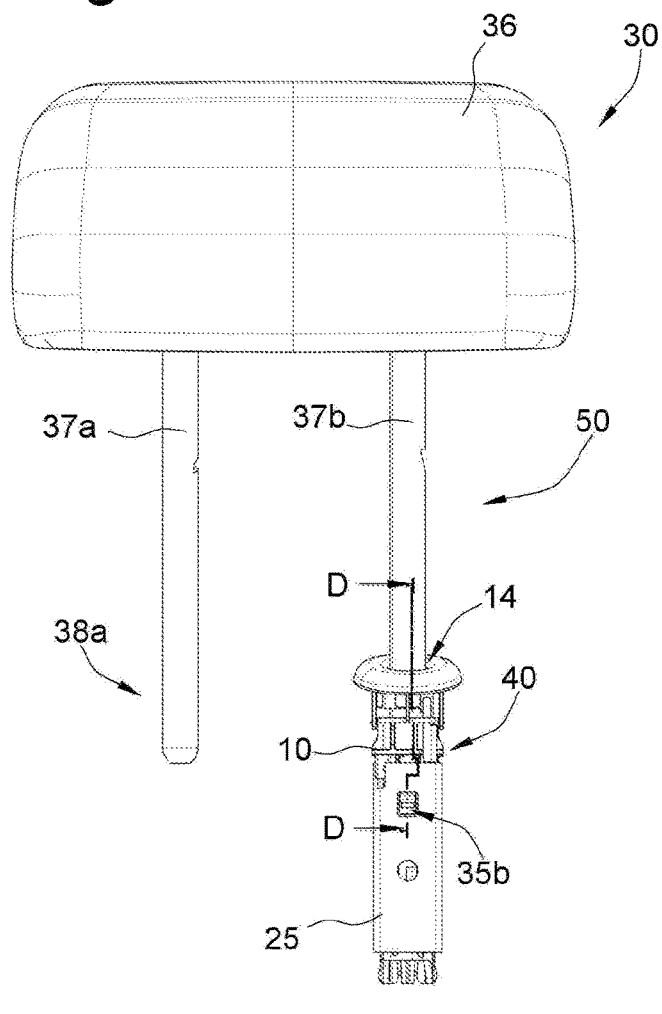
FIG. 7 is a front view based on FIG. 5, wherein the holder is in an intermediate position between the pre-mounting position and the final mounting position.
Figure 8:
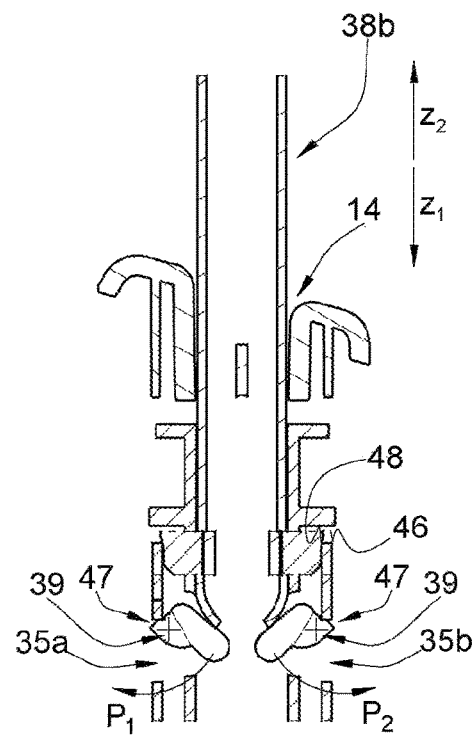
FIG. 8 is a sectional view according to section line D-D in FIG. 7.

In FIGS. 2A and 2B guide structures 21 are visible that project inwards radially to a center axis m with respect to an inner surface 22 of the holder 10 and project into the guide passage 13. A compensation structure 33 projects beyond an outer surface 41 of the holder 10. The compensation structure 33 has an insertion slope 44 that slopes such that the insertion of the holder 10 in the mounting direction $z_2$ is facilitated. An outer surface 42 of the compensation structure 33 has a radius D1 relative to the center axis m. The radius D1 is such that the outer surface 42 abuts the retaining structure with a slight interference fit or a clearance fit. Adjacent to the outer surface 42 there is formed an outer surface 45 that forms a radius D2 with the center axis m. The radius D2 is such that there is a significant interference fit relative to the retaining structure.

In FIGS. 2A and 2B the cut-outs 16a and 16b and movable elements 23a and 23b are visible. The movable elements 23a and 23b are in the present example mounted on the wall 15 of the holder 10 so as to be pivotable about a pivot axis with center point M, but they could alternatively also be supported so as to be movable in a translatory manner. The movable elements 23a and 23b are part of a deflection device 20. According to FIG. 2, the movable elements 23a and 23b are so arranged in a first position. Each latch element 23a and 23b is in the form of a two-armed lever, wherein a contact region 24 forms one lever arm and a support region 39 forms a further lever arm. In the first position, the contact regions 24 are arranged in the movement path of a retaining rod inserted into the guide passage 13.

The movable elements 23a and 23b are formed of a rigid material, for example of a rigid plastics material, in particular of a fiber-reinforced plastics material.

In FIG. 3, the holder 10 is in a pre-mounting position on a retaining structure 25. The retaining structure 25 is of sleeve-like form and has an opening 28 or 29 at both end regions 26 and 27. Cut-outs 35a and 35b are formed in opposite walls 34 of the retaining structure 25, of which only the cut-out 35b is visible in FIG. 3. The retaining structure 25 is made of metal, for example, and is welded to a structure of the backrest of a vehicle seat (not shown). However, other suitable methods of fixing come into consideration.

According to FIG. 3, the holder 10 is held in the retaining structure 25 with play or a slight oversize that is necessary for mounting and dismounting. That is to say, in the pre-mounting position, the surface 42 abuts an inner surface 31 of the retaining structure 35 with play or a slight oversize, while the surface 45 that projects further radially with respect to the center axis m, is not yet in contact with the inner surface 31 or is in contact therewith only with a part-region.

As can be seen in FIG. 4, opposite walls 34 of the retaining structure 25 have cut-outs 35a and 35b that serve for locking the holder 10 on the retaining structure 25 that will be discussed in greater detail below.

FIG. 5 shows a headrest assembly 50 that comprises a headrest 30 with a head part 36 and with retaining rods 37a and 37b. The headrest assembly additionally comprises the holder 10. The retaining rods 37a and 37b can be individual rods or ends of a hoop-shaped retaining rod. For the sake of clarity, a retaining device 40, having the holder 10 and the retaining structure 25, is shown only in relation to the retaining rod 37b. However, the retaining rod 37a is supported in a retaining device 40 in the same way.

The mounting of the holder 10 and of the headrest 30 will be described below.

The holders 10 are first arranged on the holding structures 25 in the pre-mounting position according to FIGS. 3 and 4. End regions 38a and 38b of the retaining rods 37a and 37b are then inserted through the opening 14 into the respective guide passage 13. The end regions 38a and 38b are thereby arranged in the upper end region 26 of the retaining structure 25 and are guided by the guide structures 21.

Only the insertion of the retaining rod 37b into the retaining device 40 will be described hereinbelow, although both retaining rods 37a and 37b are simultaneously inserted into separate holding devices 40.

According to FIG. 6, the holder 10 is in the pre-mounting position. The end region 38b has been inserted into the guide passage 13 so that it abuts the movable elements 23a and 23b but has not pivoted them or has pivoted them only insignificantly.

When, starting from the position of the retaining rod 37b according to FIG. 6, the retaining rod 37 is moved further into the guide passage 13 in direction $z_1$, the end region 38b exerts a force on the contact regions 24 of the movable elements 23a and 23b that are in the form of free end regions. The latch elements 23a and 23b, owing to the contact of the retaining rod 38b with the contact regions 24, are thereby pivoted, wherein the latch element 23a pivots in direction p1 and the latch element 23b pivots in direction p2. The support regions 39 of each latch element 23a and 23b are supported on an abutment surface 32 of the retaining structure 25. The abutment surface 32 can absorb forces acting in direction $z_2$.

In the present exemplary embodiment, the abutment surface 47 is formed by an intrados 47 of the cut-outs 35a and 35b. However, it can also be formed by other structures.

As a result of the pivot movement of the latch elements 23a and 23b that are supported on the wall 15 of the holder 10, the holder 10 is moved further in direction $z_1$ into its seat. The seat is reached when a stop surface 48 of the holder abuts an end face 46 of the retaining structure 25. The holder 10 is then in the end position.

As the holder moves in direction $z_1$, the outer surface 45 of the compensation structure 33 is deformed such that it abuts the inner surface 31 with an interference fit when the holder 10 is located in its seat.

As the end region 38b moves further in direction $z_1$, movable elements are moved into the second position according to FIGS. 9 and 10. According to FIGS. 9 and 10, the holder is in the end position in its seat of the retaining structure 25, wherein the end face 46 of the upper end region 26 of the retaining structure 25 is in contact with the stop surface 48 of the holder 10. In the second position according to FIG. 10, the latch elements 23a and 23b have been pivoted through about 90° from the retaining rod 37b in relation to the pre-mounting position according to FIG. 6.

Each movable element 23a and 23b on the one hand abuts the retaining rod 37b with the contact region 24 and abuts the abutment surface 47 of the retaining structure 25 with a support surface of the support region 39.

Because the support region 39 abuts the abutment surface 47, a movement of the holder 10 in direction $z_2$, that is to say in the dismounting direction, is prevented. In addition, compensation for play is provided by means of the compensation structures 33, so that the retaining rod 37b is held without play relative to the retaining structure 25.

The invention claimed is:

1. A holder for supporting a headrest in a retaining structure of a vehicle by insertion in a first mounting direction, the holder comprising:
   a guide passage
   a retaining rod of the headrest fittable in the guide passage; and
   fixing means for fixing to the retaining structure and comprising at least one deflection device having at least one movable element supported on the holder so as to be movable from a first position in which the movable element is in the movement path of the retaining rod that can be inserted into the guide passage, and a second position in which the movable element is outside the movement path, the movable element having a support region cooperating with an abutment surface of the retaining structure in moving between the first position and the second position such that the holder is loaded in a mounting direction relative to the retaining structure.

2. The holder according to claim 1, the movable element is configured such that it is movable from the first position into the second position as a result of a force applied by the retaining rod.

3. The holder according to claim 1, wherein the movable element has latching structures that are suitable for locking the holder on the retaining structure in the second position at least with respect to a dismounting direction.

4. The holder according to claim 1, wherein the movable element is configured such that in the second position a return movement of the movable element is prevented when the retaining rod is in the guide passage.

5. The holder according to claim 1, wherein at least one compensation structure formed on the holder has an interference fit in relation to surfaces of a mounting seat of the retaining structure.

6. The holder according to claim 1, wherein the movable element is supported on the holder and configured to be movable in a translatory or pivotable manner.

7. The holder according to claim 1, wherein the movable element is a lever having one lever arm cooperating with the retaining rod and one another lever arm cooperating with the retaining structure.

8. The holder according to claim 1, wherein the holder has at least one cut-out in a wall and through which the movable element can pass.

9. The holder according to claim 1, further comprising:
   first locking means of a fixing device movable in order to lock the retaining rod in at least one position relative to the holder and movable into engagement with second locking means of the retaining rod.

10. The holder according to claim 1, wherein the holder is a sleeve.

11. A headrest assembly having a headrest with a head part that can be supported by means of at least one retaining rod including the retaining rod, in the holder, wherein the holder can be supported on the retaining structure of the vehicle, wherein the holder is configured in accordance with the features of claim 1.

12. A method of mounting a holder of a headrest assembly on a retaining structure of a vehicle, comprising the following method steps:
- inserting the holder into a pre-mounting posture relative to a retaining structure of the vehicle,
- moving a retaining rod of a headrest of the headrest assembly relative to the holder in a guide passage of the holder, at least over a specific length, in a mounting direction, and
- moving at least one movable element of the holder from a first position into a second position by the moving of the retaining rod, the movable element being supported on an abutment surface of the retaining structure and a resulting force loading the holder in the mounting direction by the moving of the movable member into the second position.

13. The method according to claim 12, wherein the retaining rod is first mounted in the guide passage, and then the assembly consisting of the headrest with the retaining rod and the holder is in the retaining structure in a pre-mounting position.

14. The method according to claim 13, wherein the holder is in the retaining structure in the pre-mounting position, and subsequently the retaining rod of the headrest is inserted into the guide passage.

\* \* \* \* \*